United States Patent
Lei et al.

(10) Patent No.: US 11,539,479 B2
(45) Date of Patent: Dec. 27, 2022

(54) HARQ-ACK FOR A PLURALITY OF CARRIER GROUPS OF A DOWNLINK SLOT SET

(71) Applicant: Lenovo (Beijing) Limited, Beijing (CN)

(72) Inventors: Haipeng Lei, Beijing (CN); Robert Tristan Love, Barrington, IL (US)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/638,407

(22) PCT Filed: Aug. 11, 2017

(86) PCT No.: PCT/CN2017/097138
§ 371 (c)(1),
(2) Date: Feb. 11, 2020

(87) PCT Pub. No.: WO2019/028845
PCT Pub. Date: Feb. 14, 2019

(65) Prior Publication Data
US 2020/0374044 A1 Nov. 26, 2020

(51) Int. Cl.
*H04W 72/04* (2009.01)
*H04L 1/18* (2006.01)
(Continued)

(52) U.S. Cl.
CPC ......... *H04L 1/1896* (2013.01); *H04B 7/0456* (2013.01); *H04L 1/1819* (2013.01);
(Continued)

(58) Field of Classification Search
CPC ... H04L 1/1819; H04L 5/0055; H04L 5/0094; H04L 5/0053; H04L 5/0007;
(Continued)

(56) References Cited

U.S. PATENT DOCUMENTS

| 2017/0134140 A1* | 5/2017 | Park .................. H04L 1/0046 |
| 2018/0006791 A1* | 1/2018 | Marinier ............. H04L 1/0028 |

(Continued)

FOREIGN PATENT DOCUMENTS

| CN | 102273252 A | 12/2011 |
| CN | 102763361 A | 10/2012 |

(Continued)

OTHER PUBLICATIONS

Intel Corporation, HARQ-ACK multiplexing and bundling, 3GPP TSG RAN WG1 NR Ad-Hoc#2 R1-1710572, Jun. 27-30, 2017, pp. 1-5 (Year: 2017).*

(Continued)

*Primary Examiner* — Lan-Huong Truong
(74) *Attorney, Agent, or Firm* — Kunzler Bean & Adamson

(57) ABSTRACT

Apparatuses, methods, and systems are disclosed for communicating HARQ-ACK feedback for a plurality of carrier groups of a downlink slot set. One apparatus includes a transmitter that transmits, to a remote unit, multiple downlink transmissions in a downlink slot set. The downlink slot set comprises a first number of reference slots and a second number of carriers grouped into a plurality of carrier groups based on a subcarrier spacing value of each carrier, such that each carrier in a carrier group has the same subcarrier spacing value. The apparatus includes a receiver that receives a HARQ-ACK codebook from the remote unit for the downlink slot set, wherein the HARQ-ACK codebook for the downlink slot set corresponds to all downlink transmissions in the downlink slot set.

20 Claims, 11 Drawing Sheets

(51) Int. Cl.
*H04B 7/0456* (2017.01)
*H04L 5/00* (2006.01)
*H04L 27/26* (2006.01)

(52) U.S. Cl.
CPC .......... *H04L 5/0055* (2013.01); *H04L 5/0094* (2013.01); *H04L 27/2602* (2013.01); *H04W 72/042* (2013.01); *H04W 72/0446* (2013.01)

(58) Field of Classification Search
CPC ... H04L 27/2602; H04L 5/001; H04L 1/1896; H04L 1/1854; H04L 1/1614; H04B 7/0456; H04W 72/042; H04W 72/0446
See application file for complete search history.

(56) References Cited

U.S. PATENT DOCUMENTS

| | | | |
|---|---|---|---|
| 2018/0054800 A1* | 2/2018 | Yeo | H04L 1/0041 |
| 2021/0219328 A1* | 7/2021 | Xiong | H04L 5/0078 |

FOREIGN PATENT DOCUMENTS

| | | | | |
|---|---|---|---|---|
| CN | 103329472 | A | 9/2013 | |
| CN | 104396174 | A | 3/2015 | |
| CN | 106549734 | A | 3/2017 | |
| WO | 2013070168 | A1 | 5/2013 | |
| WO | 2016162791 | A1 | 10/2016 | |
| WO | 2017028001 | A1 | 2/2017 | |
| WO | 2017030489 | A1 | 2/2017 | |
| WO | 2017044066 | A1 | 3/2017 | |
| WO | 2017045499 | A1 | 3/2017 | |
| WO | WO-2017052345 | A1 * | 3/2017 | ............. H04L 5/001 |

OTHER PUBLICATIONS

International Application No. PCT/CN2017/097138, "Notification of Transmittal of the International Search Report and the Written Opinion of the International Searching Authority", May 3, 2018, pp. 1-11.
Samsung, "HARQ-ACK codebook determination", 3GPP TSG RAN WG1 Meeting #89 R1-1708025, May 15-19, 2017, pp. 1-4.
Intel Corporation, HARQ-ACK multiplexing and bundling, 3GPP TSG RAN WG1 NR Ad-Hoc#2 R1-1710572, Jun. 27-30, 2017, pp. 1-5.
Intel Corporation, "HARQ aspects for carrier aggregation", 3GPP TSG RAN WG1 Meeting #89 R1-1707417, May 15-19, 2017, pp. 1-5.
Huawei, Hisilicon, "Multiplexing of multiple HARQ-ACK feedback", 3GPP TSG RAN WG1 Meeting #89 R1-1708151, May 15-19, 2017, pp. 1-3.
Ericsson, "On HARQ Codebook", GPP TSG-RAN WG1 #89 R1-1709101, May 15-19, 2017, pp. 1-2.
Nokia, Alcatel-Lucent Shanghai Bell, "On HARQ feedback determination", 3GPP TSG RAN WG1#89 R1-1708527, May 15-19, 2017, pp. 1-3.
3GPP, "3rd Generation Partnership Project; Technical Specification Group Radio Access Network; NR; Physical channels and modulation (Release 15)", 3GPP TS 38.211 V0.1.0, Jun. 2017, pp. 1-22.
3GPP, "3rd Generation Partnership Project; Technical Specification Group Radio Access Network; Evolved Universal Terrestrial Radio Access (E-UTRA); Physical layer procedures (Release 13)", 3GPP TS 36.213 V13.6.0, Jun. 2017, pp. 1-390.

* cited by examiner

HARQ-ACK FOR A PLURALITY OF CARRIER GROUPS OF A DOWNLINK SLOT SET

FIELD

The subject matter disclosed herein relates generally to wireless communications and more particularly relates to communicating HARQ-ACK feedback for a plurality of carrier groups of a downlink slot set.

BACKGROUND

The following abbreviations are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Cyclic Prefix ("CP"), Channel State Information ("CSI"), Common Search Space ("CSS"), Discrete Fourier Transform Spread ("DFTS"), Downlink Assignment Index ("DAI"), Downlink Control Information ("DCI"), Downlink ("DL"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Multiple Input Multiple Output ("MIMO"), Multi User Shared Access ("MUSA"), Narrowband ("NB"), Negative-Acknowledgment ("NACK") or ("NAK"), New Data Indicator ("NDI"), Network Function ("NF"), Next Generation Node B ("gNB"), New Radio ("NR"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), Transport Block ("TB"), Transport Block Size ("TBS"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Entity/Equipment (Mobile Terminal) ("UE"), Uplink ("UL"), User Plane Function ("UPF"), Universal Mobile Telecommunications System ("UMTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, downlink transport blocks are carried on the Physical Downlink Shared Channel (PDSCH). HARQ-ACK feedback bits corresponding to the PDSCH are transmitted either on the Physical Uplink Control Channel (PUCCH) or on the Physical Uplink Shared Channel (PUSCH). Additionally, 5G networks support multiple transmission numerologies, such as 15, 30, and 60 kHz subcarrier spacing values for below 6 GHz and 60 and 120 kHz subcarrier spacing values for above 6 GHz. To enable carrier aggregation scenarios across carrier frequencies below 6 GHz, across carrier frequencies above 6 GHz, and across low-high band, carrier combinations between 15, 30, 60, and 120 kHz needs to be supported. In total, numerologies of 15, 30, 60, 120, 240, and 480 kHz are supported.

However, in 5G networks, when carriers with different subcarrier spacing values are aggregated together, the different slot lengths may make it difficult to align for transmitting the corresponding HARQ-ACK feedback in one UCI.

BRIEF SUMMARY

Methods for communicating HARQ-ACK feedback for a plurality of carrier groups of a downlink slot set based on the DAI are disclosed. Apparatuses and systems also perform the functions of the methods. The methods may also be embodied in one or more computer program products comprising executable code.

In one embodiment, a method for communicating HARQ-ACK feedback for a plurality of carrier groups of a downlink slot set, to a remote unit, multiple downlink transmissions in a downlink slot set. Here, the downlink slot set includes a first number of reference slots and a second number of carriers. The second number of carriers are grouped into a plurality of carrier groups based on a subcarrier spacing value of each carrier, such that each carrier in a carrier group has the same subcarrier spacing value. The method also includes receiving a hybrid automatic repeat request acknowledgement ("HARQ-ACK") codebook from the remote unit for the downlink slot set. Here, the HARQ-ACK codebook for the downlink slot set corresponds to all downlink transmissions in the downlink slot set.

Another method for communicating HARQ-ACK feedback for a plurality of carrier groups of a downlink slot set includes receiving, from a base unit, multiple downlink transmissions in a downlink slot set. Here, the downlink slot set comprises a first number of reference slots and a second number of carriers. The method includes grouping the multiple carriers into a plurality of carrier groups based on a subcarrier spacing value of each carrier, such that each carrier in a carrier group has the same subcarrier spacing value. The method also includes transmitting a HARQ-ACK codebook to the base unit for the downlink slot set. Here, the HARQ-ACK codebook for the downlink slot set corresponds to all downlink transmissions in the downlink slot set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
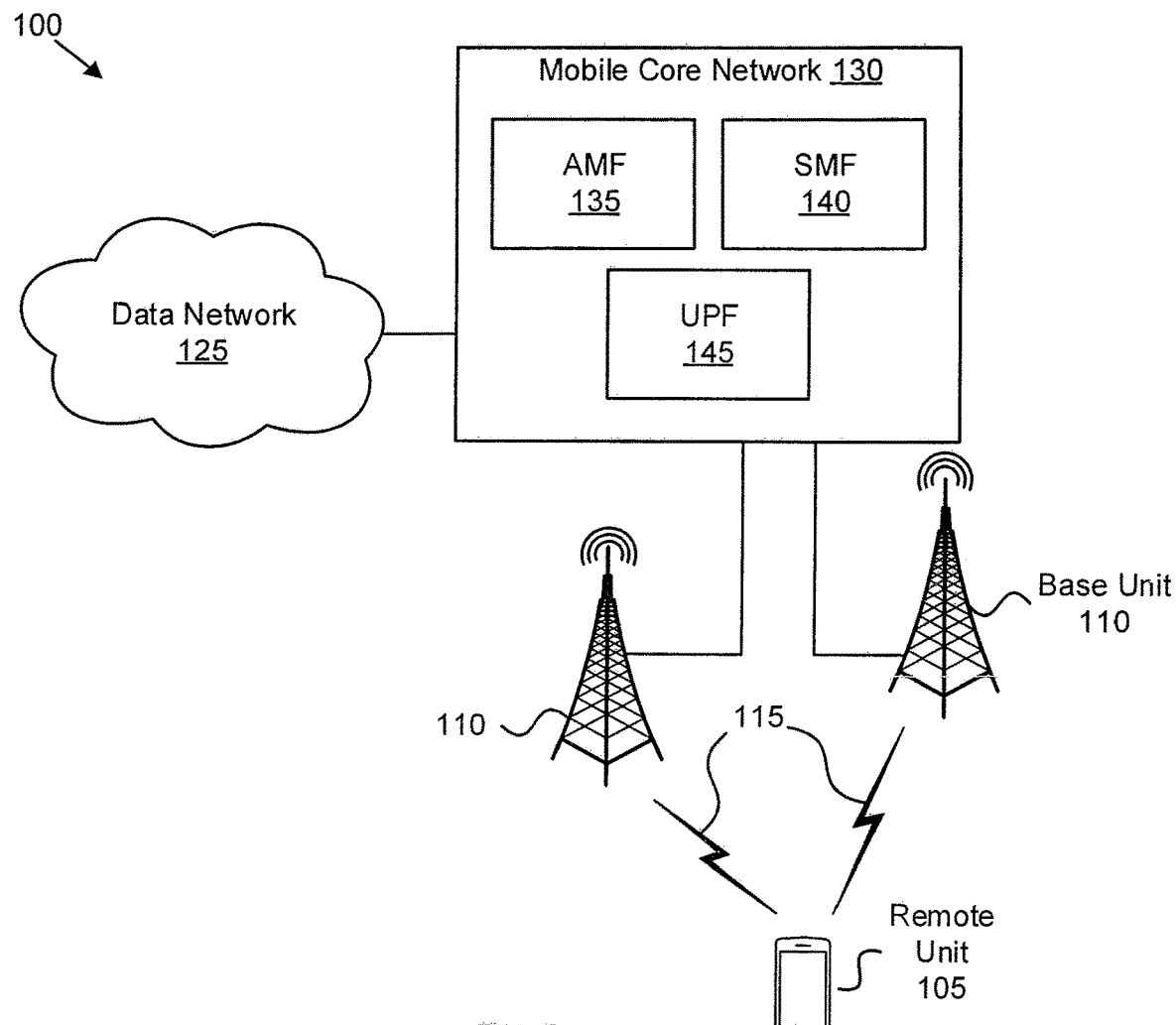
FIG. 1 is a schematic block diagram illustrating one embodiment of a wireless communication system for communicating HARQ-ACK feedback for a plurality of carrier groups of a downlink slot set.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for communicating HARQ-ACK feedback for a plurality of carrier groups of a downlink slot set, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE-A or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, user equipment ("UE"), user terminals, a device, or by other terminology used in the art. The remote units 105 may communicate directly with one or more of the base units 110 via uplink ("UL") and downlink ("DL") communication signals, for example a remote unit 105 may send data in a transmission block ("TB") to a base unit 110 via UL communication signals and receive data or control signals from the base unit via DL communication signals. Furthermore, the UL and DL communication signals may be carried over the communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN") that may include one or more controllers communicably coupled to one or more corresponding base units 110. The RAN is generally communicably coupled to one or more core networks, which in turn may be coupled to other networks, like the Internet and public switched telephone networks, among other networks. These and other elements of radio access and core networks are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

As discussed in further detail below, a base unit 110 may transmit, to a remote unit 105, multiple downlink transmissions in a downlink slot set, the downlink slot set having a first number of reference slots and a second number of carriers (e.g., serving cells). Moreover, the second number of carriers are grouped into a plurality of carrier groups based on a subcarrier spacing value of each carrier, such that each carrier in a carrier group has the same subcarrier spacing value. Here, each downlink transmission has a downlink assignment index ("DAI"), for example based on the carrier groups or on the downlink slot set.

Meanwhile, the remote unit 105 receives the downlink transmissions in the downlink slot set and groups the multiple carriers into a plurality of carrier groups based on a subcarrier spacing value of each carrier, such that each carrier in a carrier group has the same subcarrier spacing value. The remote unit 105 formulates a HARQ-ACK codebook for the downlink slot set and transmits it to the base unit 110. Here, the HARQ-ACK codebook for the downlink slot set corresponds to all downlink transmissions in the downlink slot set and each bit in the HARQ-ACK codebook is ordered based on the DAI.

Figure 2:
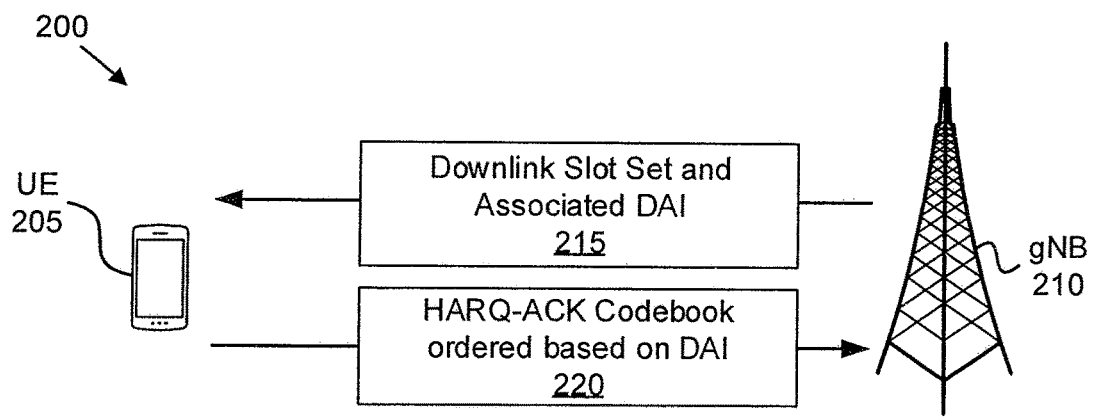
FIG. 2 illustrates one embodiment of a network architecture for communicating HARQ-ACK feedback for a plurality of carrier groups of a downlink slot set.

FIG. 2 depicts a network 200 used for communicating HARQ-ACK feedback for a plurality of carrier groups of a downlink slot set, according to embodiments of the disclosure. The network 200 includes a UE 205 and gNB 210. The network 200 depicts a simplified embodiment of the wireless communication system 100. The UE 205 may be one embodiment of the remote unit 105, while the gNB 210 may be one embodiment of the base unit 110. Here, the gNB 210 may be a gNB or 5G base station. Although only one UE 205 is depicted, in other embodiments the gNB 210 may serve a plurality of UEs 205.

As depicted, the gNB 210 transmits multiple downlink transmissions in a downlink slot set to the UE 205 as well as associated DAI values. As used herein, a downlink slot set includes multiple downlink transmissions, such as PDSCH transmission(s) associated with PDCCH and/or PDCCH indicating DL SPS release, transmitted over multiple slots and on multiple carriers. A downlink slot set is also referred to herein as a "bundle window." The gNB 210 transmits a DAI corresponding to each of multiple downlink transmissions in a DL grant corresponding to the downlink transmission. The DAI for each of the downlink transmissions is based on the downlink slot set, as described in further detail below. In one embodiment, the DAI contains a group DAI, a per-group counter DAI, and a per-group total DAI. In another embodiment, the DAI contains a per-set counter DAI and a per-set total DAI. Various DAI schemes are depicted in FIGS. 6-15 and described below.

The UE 205 receives the downlink transmission and the DAI and formulates a HARQ-ACK codebook for providing feedback to the gNB 210. Here, the size of the HARQ-ACK codebook is determined based on the DAI and the bit placement (e.g., order) of the HARQ-ACK feedback is also based on the DAI values corresponding to the multiple downlink transmissions.

Figure 3:
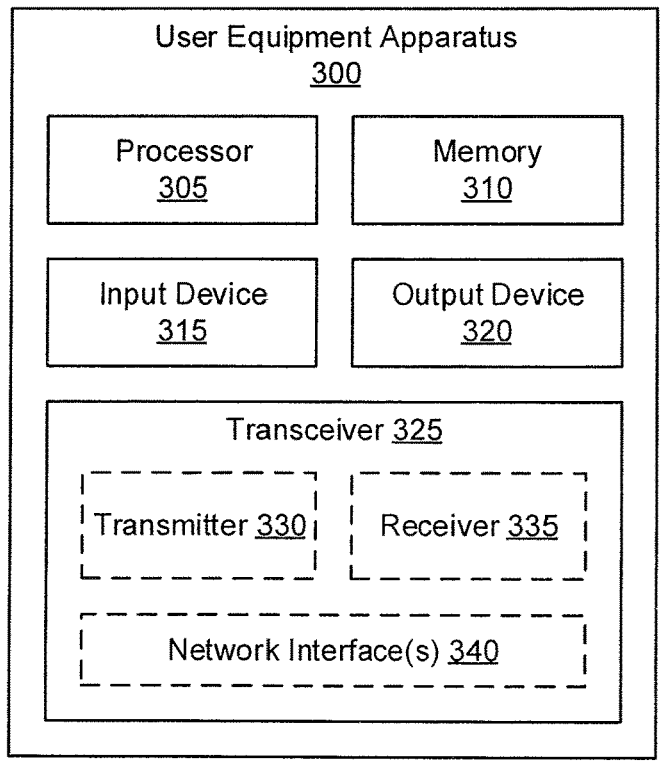
FIG. 3 is a schematic block diagram illustrating one embodiment of a user equipment apparatus for communicating HARQ-ACK feedback codebook for a plurality of carrier groups of a downlink slot set.

FIG. 3 depicts one embodiment of a user equipment apparatus 300 that may be used for communicating HARQ-ACK feedback for a plurality of carrier groups of a downlink slot set, according to embodiments of the disclosure. The user equipment apparatus 300 may be one embodiment of the remote unit 105 and/or the UE 205, described above. Furthermore, the user equipment apparatus 300 may include a processor 305, a memory 310, an input device 315, an output device 320, a transceiver 325 for communicating with one or more base units 110.

As depicted, the transceiver 325 may include a transmitter 330 and a receiver 335. The transceiver 325 may also support one or more network interfaces 340, such as the Uu interface used to communicate with a gNB. In some embodiments, the input device 315 and the output device 320 are combined into a single device, such as a touchscreen. In certain embodiments, the user equipment apparatus 300 may not include any input device 315 and/or output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 may control the receiver 335 to receive, from a base unit (such as the gNB 210), multiple downlink transmissions in a downlink slot set. Here, the downlink slot set includes a first number of reference slots and a second number of carriers. Moreover, each downlink transmission having a downlink assignment index ("DAI"). The processor 305 groups the multiple carriers into a plurality of carrier groups based on a subcarrier spacing value of each carrier, such that each carrier in a carrier group has the same subcarrier spacing value. Here, the value of the DAI is based on the location of the downlink transmissions within the carrier groups and reference slots. A reference slot is defined based on a slot of a carrier group having the smallest subcarrier spacing. In certain embodiments, the duration of the reference slot may be equal to the slot duration of the carrier group with the smallest subcarrier spacing. Moreover, the processor 305 may use the DAI to determine whether it has missed receiving a slot and to synchronize the dynamic codebook size with the base unit.

At an appropriate time, the processor 305 controls the transmitter 330 to transmit a HARQ-ACK codebook to the base unit for the downlink slot set. Here, the HARQ-ACK codebook for the downlink slot set corresponds to all downlink transmissions in the downlink slot set and each bit in the HARQ-ACK codebook is ordered based on the DAI. The processor 305 may use the DAI values to determine the bit positions within a carrier-group-and-reference-slot-specific HARQ-ACK codebook. In some embodiments, the carriers in each carrier group are ordered increasingly by carrier index. Next, processor 305 concatenates the carrier-group-and-reference-slot-specific HARQ-ACK codebooks (e.g., in order from a first scheduled carrier group to a last scheduled carrier group) to form a reference-slot-specific HARQ-ACK codebook. In some embodiments, the carrier groups are ordered increasingly by subcarrier spacing value. Moreover, the processor 305 concatenates the reference-slot-specific HARQ-ACK codebooks (e.g., in order from a first reference slot to a last reference slot) to form the HARQ-ACK codebook transmitted to the base unit.

In some embodiments, the DAI includes one or more of: a first DAI, a second DAI and a third DAI. In certain embodiments, the DAI may be a set consisting of the first DAI (e.g., a group DAI), the second DAI (e.g., a per-group counter DAD, and the third DAI (e.g., a per-group total DAI). In further embodiments, the combination of first, second, and third DAIs may form a unique tuple for each downlink transmission in the downlink slot set. Examples of the first DAI are discussed above, particularly with reference to FIGS. 6-10. In certain embodiments, the DAI may be a set consisting of the second DAI (e.g., the accumulative DAI) and the third DAI (e.g., the total DAI). Examples of the second DAI are discussed above, particularly with reference to FIGS. 11-12. Examples of the third DAI are discussed above, particularly with reference to FIGS. 13-15.

Figure 6:
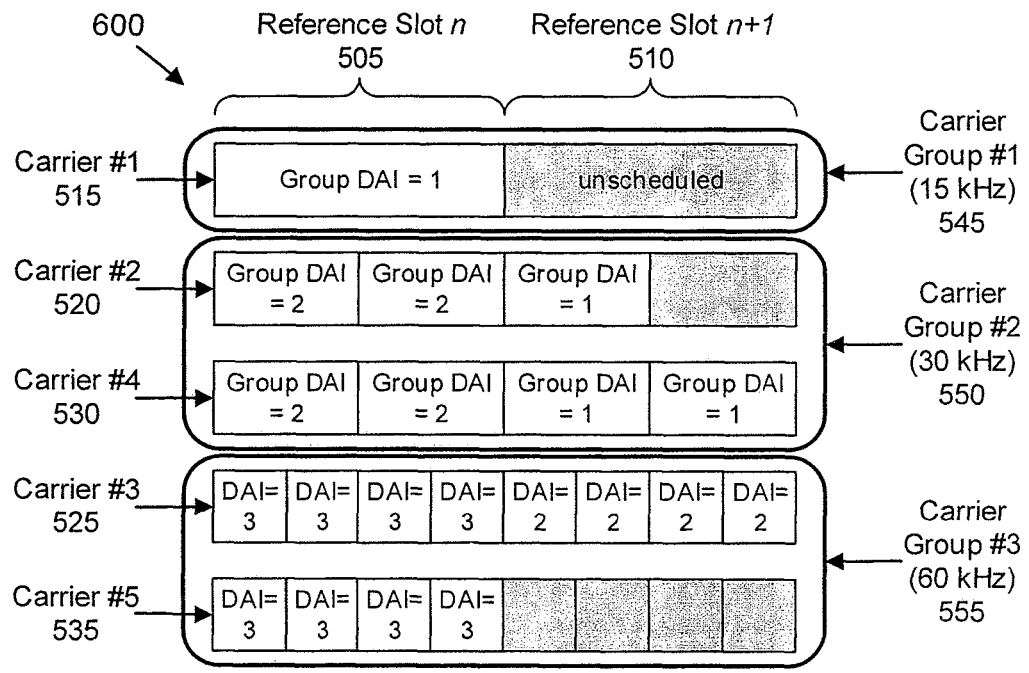
FIG. 6 is a block diagram illustrating a first embodiment of a group DAI used for communicating HARQ-ACK feedback for a plurality of carrier groups of a downlink slot set.

In a first embodiment, the first DAI (e.g., the group DAI) denotes the accumulative number of carrier groups in which at least one downlink transmission is present in a reference slot of the downlink slot set. Here, the accumulative number of carrier groups resets from reference slot to reference slot. The accumulative number starts counting from an initial carrier group in the reference slot and counts up to a present carrier group in the reference slot. In this embodiment, the first DAI has the same value for all downlink transmissions in a same carrier group and a same reference slot. Further, the first DAI may differ from carrier group to carrier group within the same reference slot. An example of this embodiment is depicted in FIG. 6.

Figure 7:
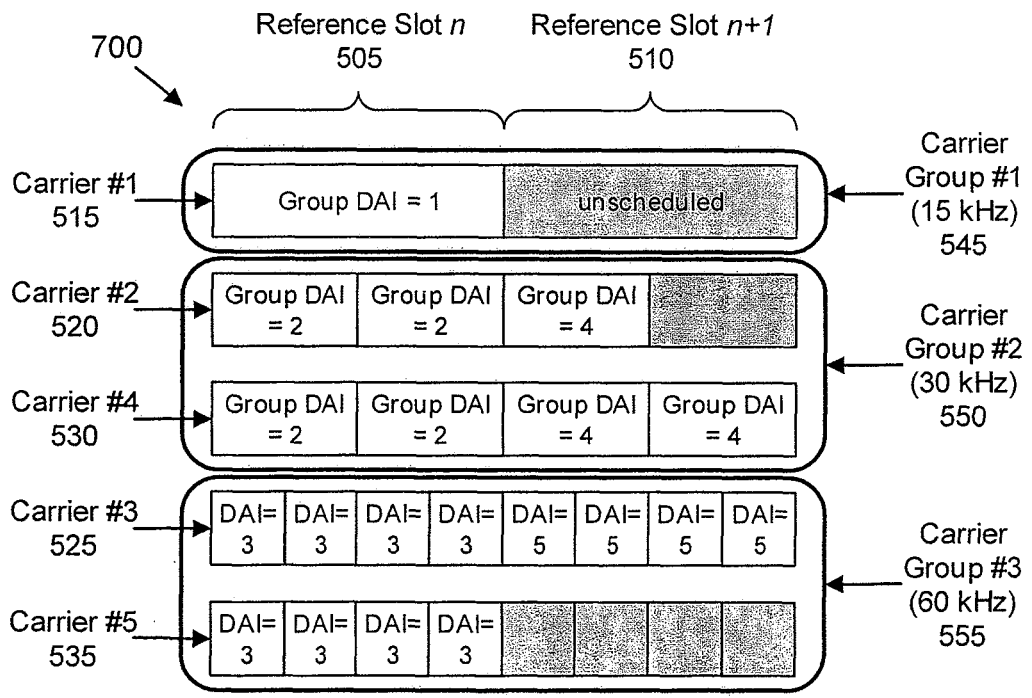
FIG. 7 is a block diagram illustrating a second embodiment of a group DAI used for communicating HARQ-ACK feedback for a plurality of carrier groups of a downlink slot set.

In a second embodiment, the first DAI (e.g., the group DAI) denotes the accumulative number of carrier groups in which at least one downlink transmission is present in a reference slot of the downlink slot set. Here, the accumulative number of carrier groups is updated (e.g., accumulates) from reference slot to reference slot within the same downlink slot set. The accumulative number starts counting from an initial carrier group in an initial reference slot of the downlink slot set to a present combination of carrier group and reference slot. In this embodiment, the first DAI has the same value for all downlink transmissions in a same carrier group and a same reference slot. Further, the first DAI may differ from carrier group to carrier group within the same reference slot. An example of this embodiment is depicted in FIG. 7.

Figure 8:
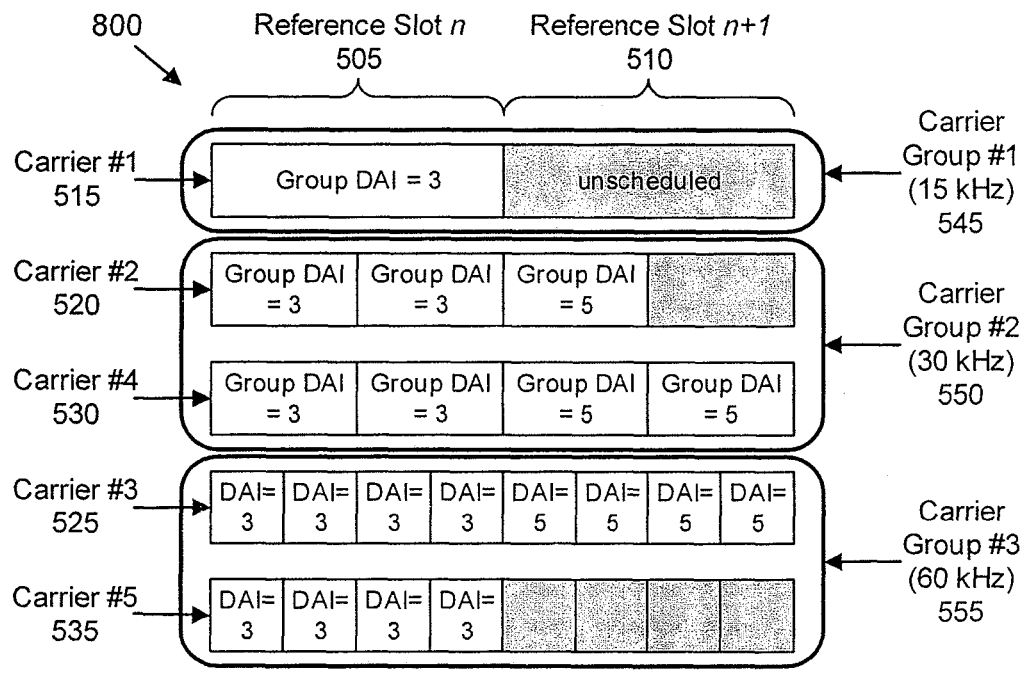
FIG. 8 is a block diagram illustrating a third embodiment of a group DAI used for communicating HARQ-ACK feedback for a plurality of carrier groups of a downlink slot set.

In a third embodiment, the first DAI (e.g., the group DAI) denotes the total number of carrier groups in which at least one downlink transmission is present during one reference slot. Here, the total number of carrier groups updates (e.g., accumulates) from reference slot to reference slot over the download slot set, such that the value of first DAI in the last reference slot is equal to the total number of downlink transmissions in the downlink slot set. In this embodiment, the first DAI has the same value for all downlink transmissions in the same reference slot. Moreover, the first DAI may differ from one reference slot to another within the download slot set, depending on the number and placement of the download transmissions. An example of this embodiment is depicted in FIG. 8.

Figure 9:
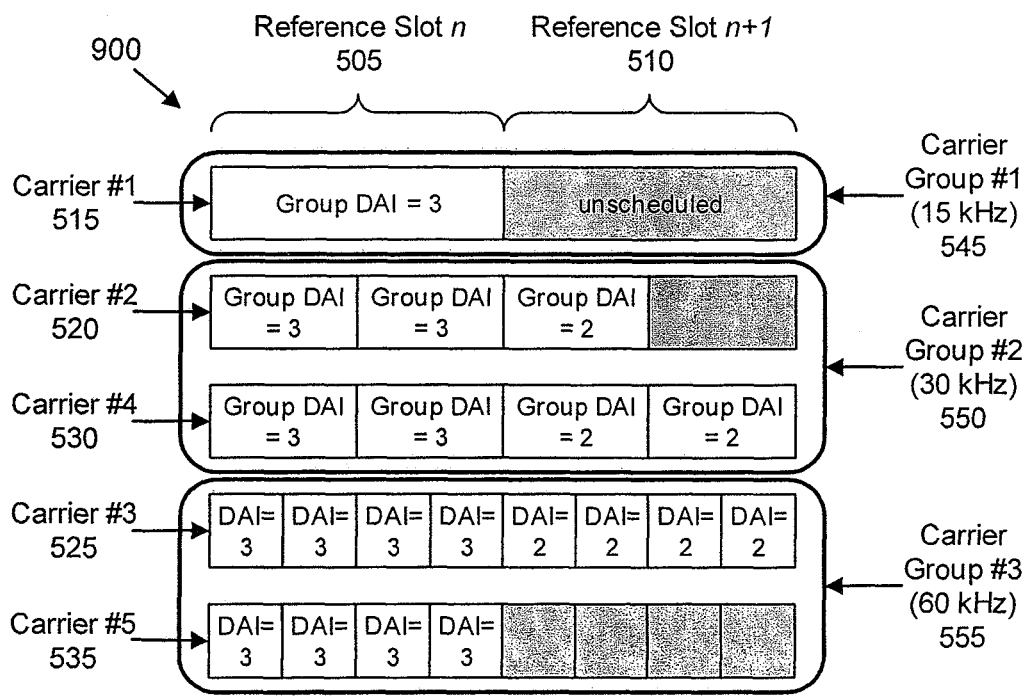
FIG. 9 is a block diagram illustrating a fourth embodiment of a group DAI used for communicating HARQ-ACK feedback for a plurality of carrier groups of a downlink slot set.

In a fourth embodiment, the first DAI (e.g., the group DAI) denotes the total number of carrier groups in which at least one downlink transmission is present during one reference slot. Here, the total number of carrier groups resets (e.g., does not accumulate) from reference slot to reference slot over the download slot set. In this embodiment, the first DAI has the same value for all downlink transmissions in the same reference slot. Moreover, the first DAI may differ from one reference slot to another within the download slot set, depending on the number and placement of the download transmissions. An example of this embodiment is depicted in FIG. 9.

Figure 10:
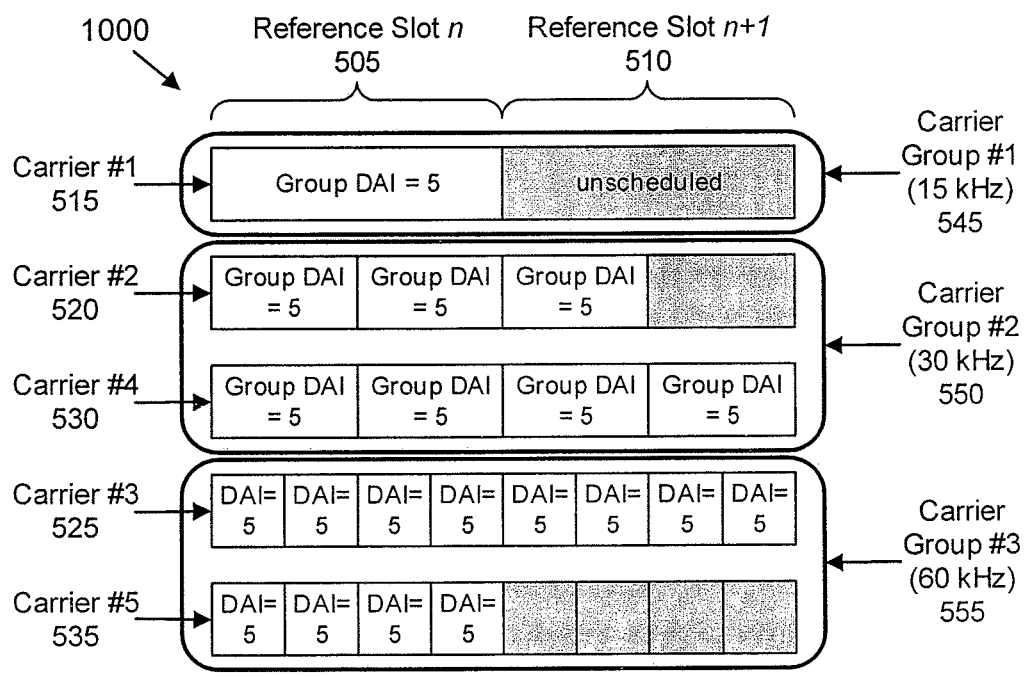
FIG. 10 is a block diagram illustrating a fifth embodiment of a group DAI used for communicating HARQ-ACK feedback for a plurality of carrier groups of a downlink slot set.

In a fifth embodiment, the first DAI (e.g., the group DAI) denotes the total number of carrier group and reference slot combinations in which at least one downlink transmission is present in the downlink slot set. Here, the first DAI has the same value for all downlink transmissions in the downlink slot set. An example of this embodiment is depicted in FIG. 10.

In the above embodiments, the second DAI (e.g., the per-group counter DAI) may denote the accumulative number of downlink transmissions within a carrier group, from an initial downlink transmission in the carrier group up to a present carrier and present slot combination. Here, the accumulative number increments first in increasing order of carrier index within a carrier group then in increasing order of slot index within a reference slot. Additionally, the third DAI (e.g., the per-group total DAI) may denote the total number of downlink transmissions within a carrier group, from an initial downlink transmission in the carrier group up to a present slot. Here, the third DAI is updated from slot to slot within the reference slot. Note that the value of the third DAI may vary from slot to slot in the downlink slot set, depending on the number and placement of the download transmissions.

Figure 11:
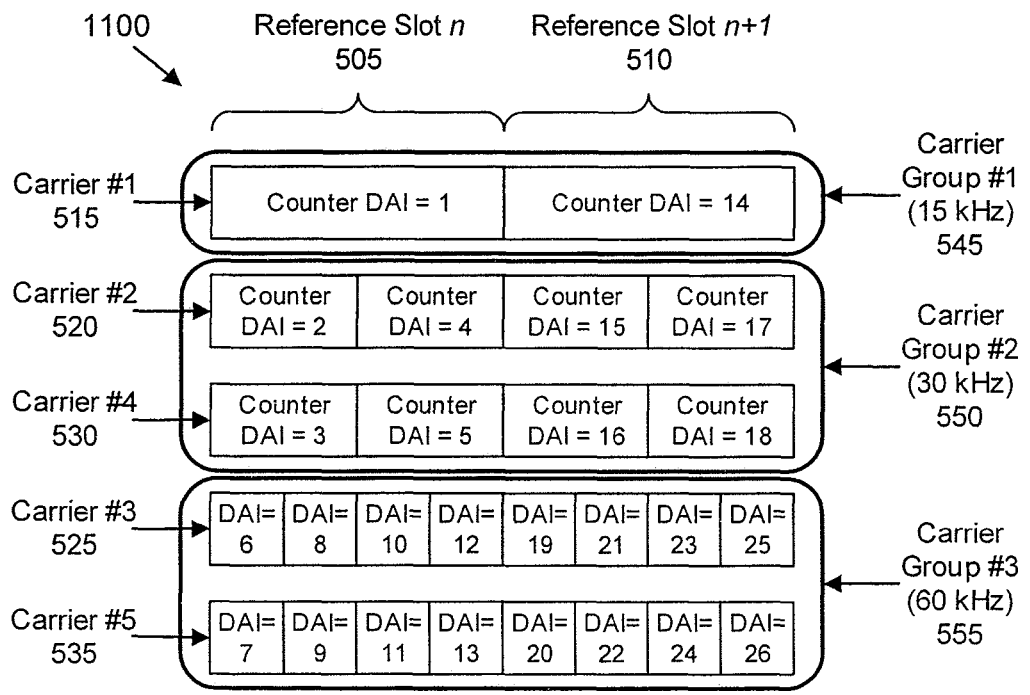
FIG. 11 is a block diagram illustrating a first embodiment of a counter DAI used for communicating HARQ-ACK feedback for a plurality of carrier groups of a downlink slot set.
Figure 12:
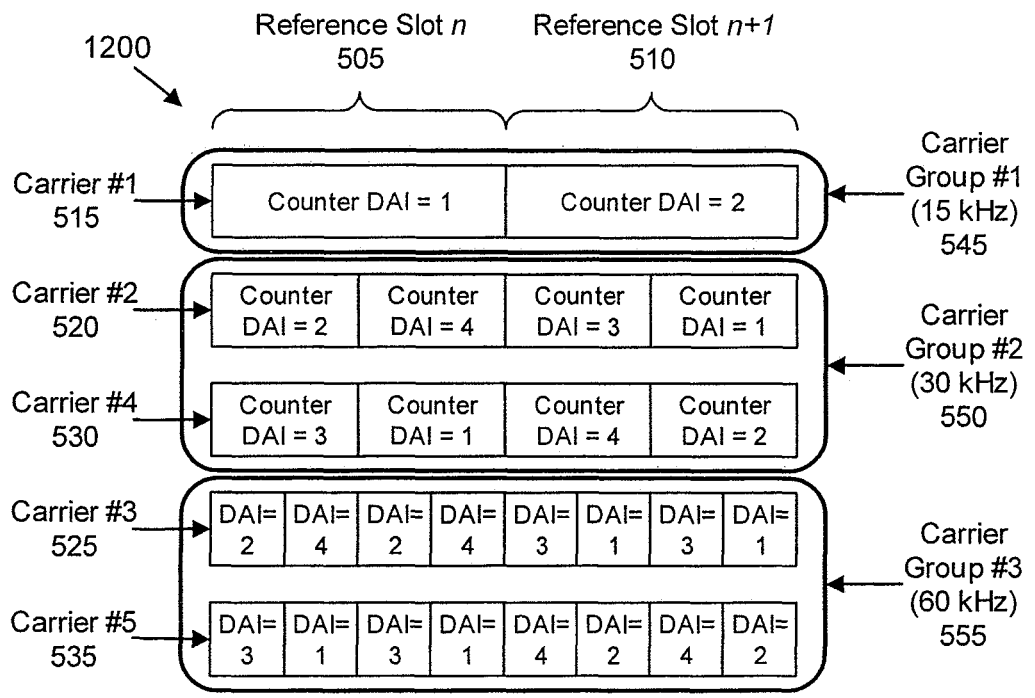
FIG. 12 is a block diagram illustrating a second embodiment of a counter DAI used for communicating HARQ-ACK feedback for a plurality of carrier groups of a downlink slot set.

In some embodiments, the DAI may be a set consisting of the second DAI (e.g., the accumulative DAI) and the third DAI (e.g., the total DAI). Here, the second DAI (e.g., the accumulative DAI) may denote the accumulative number of carrier group, carrier, and slot combinations of the downlink slot set in which a downlink transmission is present, where the accumulative number of carrier groups updates (e.g., accumulates) from combination to combination within the same downlink slot set. The second DAI counting from an initial carrier group, carrier and slot combination up to a present carrier group, carrier and slot combination. In such embodiments, the accumulative number increments first in increasing order of carrier group, then in increasing order of carrier index within the carrier group, and then in increasing order of slot index within the downlink slot set. Examples of the second DAI are depicted in FIGS. 11 and 12.

Figure 13:
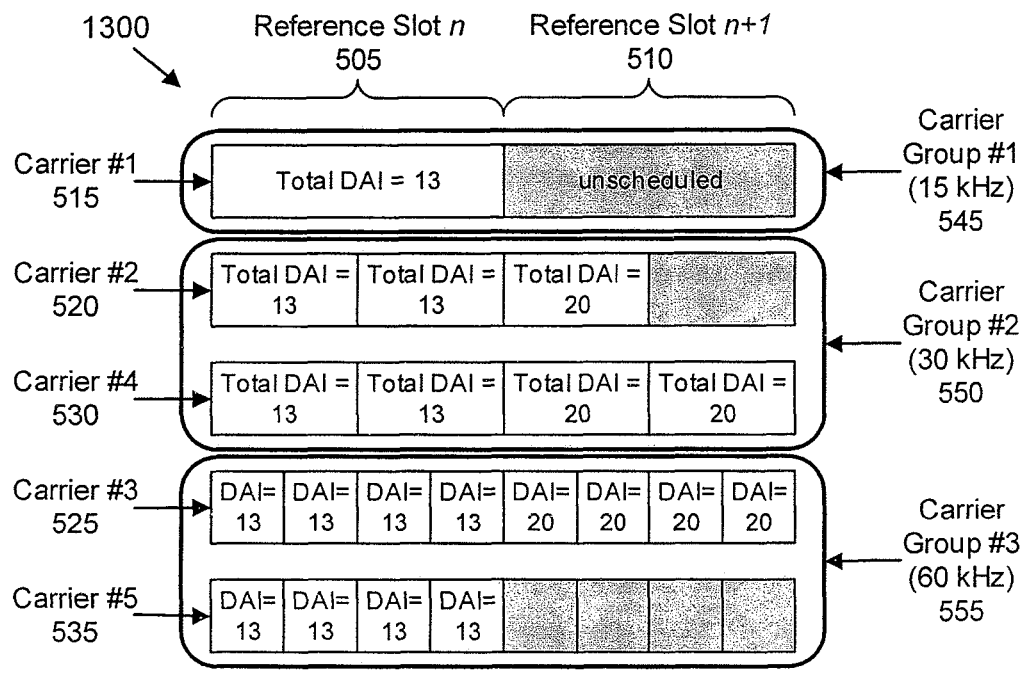
FIG. 13 is a block diagram illustrating a first embodiment of a total DAI used for communicating HARQ-ACK feedback for a plurality of carrier groups of a downlink slot set.

In a first embodiment, the value of the third DAI (e.g., the total DAI) denotes a total number of carrier group, carrier, and slot combinations in which a downlink transmission is present. Here, the total number updates (e.g., accumulates) from reference slot to reference slot within the downlink slot set. In this embodiment, the third DAI has the same value for all downlink transmissions in the same reference slot. Further, the third DAI may differ from reference slot to reference slot within the same downlink slot set. An example of this embodiment is depicted in FIG. 13.

Figure 14:
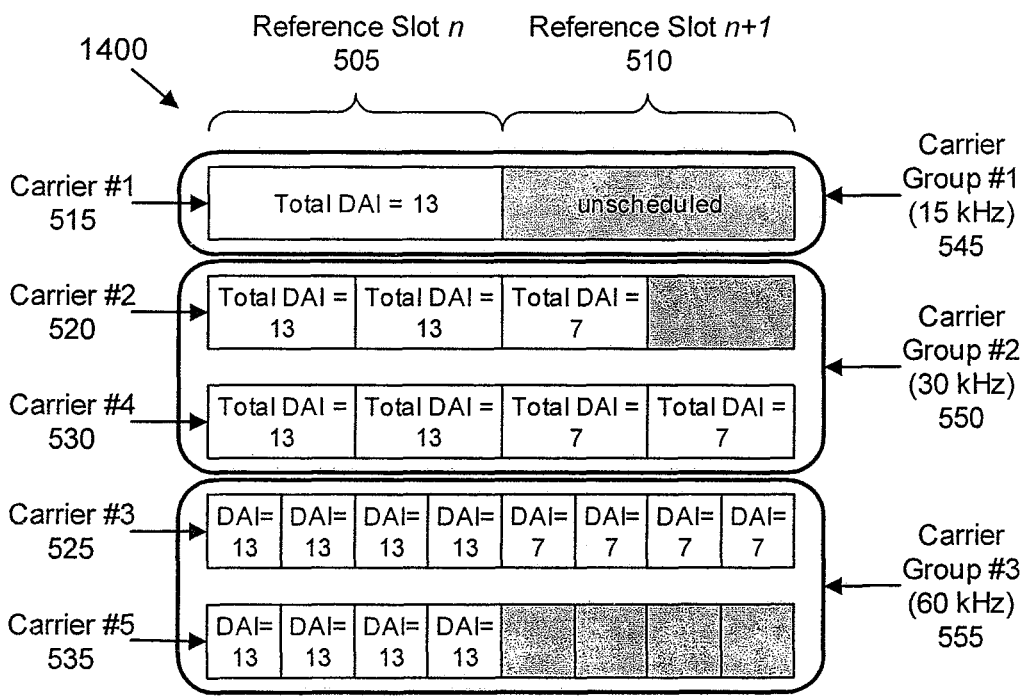
FIG. 14 is a block diagram illustrating a second embodiment of a total DAI used for communicating HARQ-ACK feedback for a plurality of carrier groups of a downlink slot set.

In a second embodiment, the value of the third DAI (e.g., the total DAI) denotes a total number of carrier group, carrier, and slot combinations in which a downlink transmission is present for a present reference slot within the downlink slot set. Here, the total number resets (e.g., does not accumulate) from reference slot to reference slot within the downlink slot set. In this embodiment, the third DAI has the same value for all downlink transmissions in the same reference slot. Further, the third DAI may differ from reference slot to reference slot within the same downlink slot set, depending on the number and placement of the download transmissions. An example of this embodiment is depicted in FIG. 14.

Figure 15:
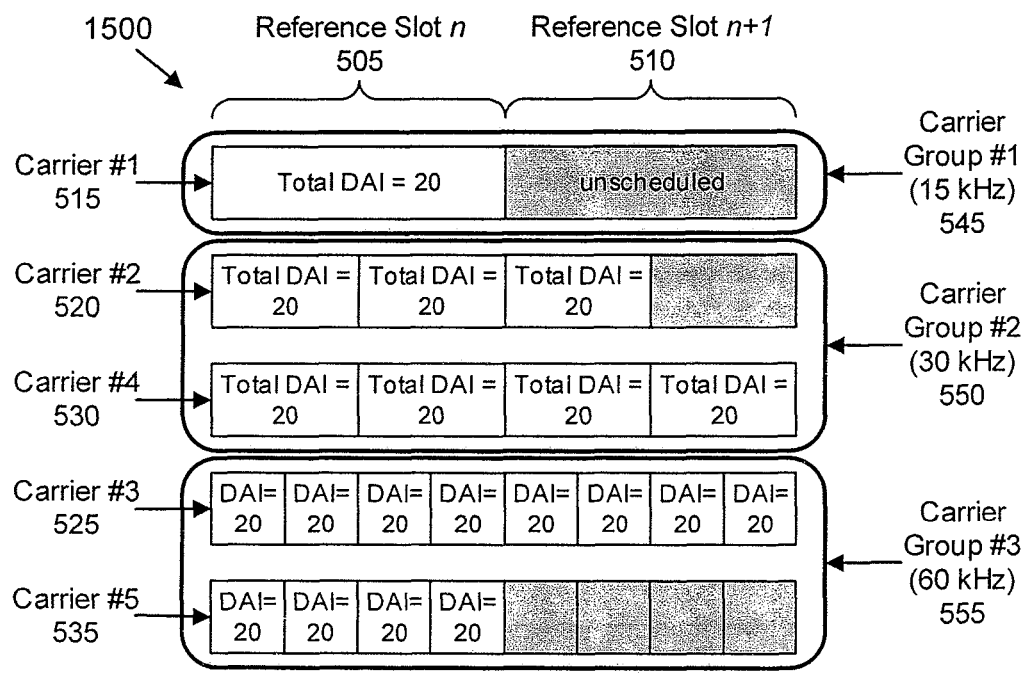
FIG. 15 is a block diagram illustrating a third embodiment of a total DAI used for communicating HARQ-ACK feedback for a plurality of carrier groups of a downlink slot set.

In a third embodiment, the value of the third DAI denotes a total number of downlink transmissions for the downlink slot set and is a same value for all downlink transmissions in the downlink slot set. An example of this embodiment is depicted in FIG. 15.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to communicating HARQ-ACK feedback for a plurality of carrier groups of a downlink slot set. For example, the memory 310 may store DAI values, carrier groups, HARQ-ACK feedback, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes two or more different devices, such as a keyboard and a touch panel. In certain embodiments, the input device 315 may include a camera for capturing images or otherwise inputting visual data.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with base units 110 of a mobile communication network. The transceiver 325 may include one or more transmitters 330 and one or more receivers 335. As discussed above, the transceiver 325 may support one or more the network interface 340 for communicating with the base unit 110.

Figure 4:
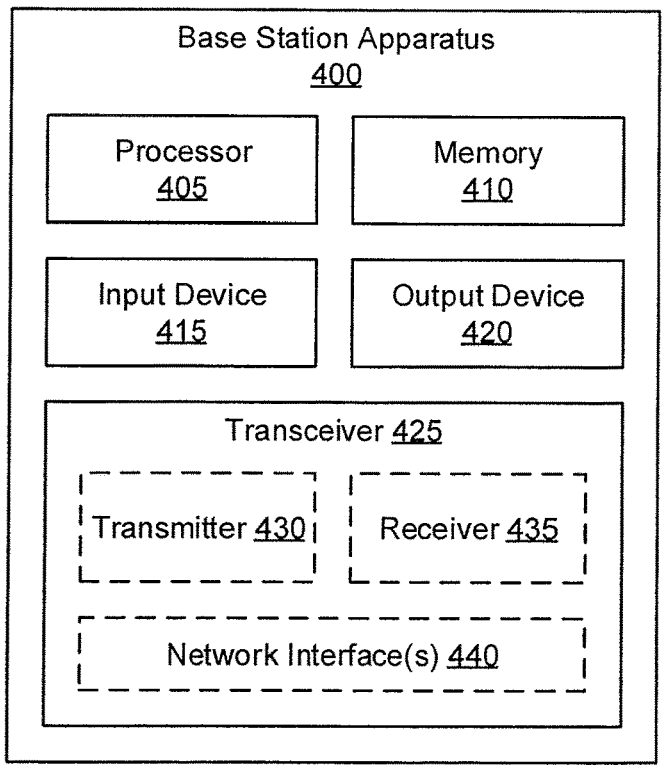
FIG. 4 is a schematic block diagram illustrating another embodiment of a base station apparatus for communicating HARQ-ACK feedback for a plurality of carrier groups of a downlink slot set.

FIG. 4 depicts one embodiment of a base station apparatus 400 that may be used for communicating HARQ-ACK feedback for a plurality of carrier groups of a downlink slot set, according to embodiments of the disclosure. The base station apparatus 400 may be one embodiment of the base unit 110 and/or gNB 210, described above. Furthermore, the base station apparatus 400 may include a processor 405, a memory 410, an input device 415, an output device 420, a transceiver 425 for communicating with one or more remote units 105 and/or a mobile core network 130.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 controls the transmitter 430 to transmit, to a particular remote unit (such as the UE 205), multiple downlink transmissions in a downlink slot set. Here, the downlink slot set includes a first number of reference slots and a second number of carriers. The second number of carriers are grouped into a plurality of carrier groups based on a subcarrier spacing value of each carrier, such that each carrier in a carrier group has the same subcarrier spacing value. Additionally, each downlink transmission has a downlink assignment index ("DAI") that is based at least in part on the carrier grouping. In some embodiments, the carriers in each carrier group are ordered increasingly by carrier index and/or the carrier groups are ordered increasingly by subcarrier spacing value. The carrier order and carrier group order are used to determine the DAI value for a DL transmission, as discussed herein.

The reference slot is defined based on a slot of a carrier group having the smallest subcarrier spacing. In certain embodiments, the duration of the reference slot is equal to the slot duration of the carrier group with the smallest subcarrier spacing. For example, where the carrier group with the smallest subcarrier spacing has a subcarrier spacing of 15 kHz and a slot duration of 14 symbols, then the reference slot for the downlink slot set may be defined as being 14 symbols in length. As another example, where the carrier group with the smallest subcarrier spacing has a subcarrier spacing of 30 kHz and a slot duration of 7 symbols, then the reference slot for the downlink slot set may be defined as being 7 symbols in length.

The receiver 435 receives a hybrid automatic repeat request acknowledgement ("HARQ-ACK") codebook from the particular remote unit for the downlink slot set, wherein the HARQ-ACK codebook for the downlink slot set corresponds to all downlink transmissions in the downlink slot set and each bit in the HARQ-ACK codebook is ordered based on the DAI. The processor 405 then determines whether to reschedule a downlink transmission to the particular remote unit based on the received HARQ-ACK codebook.

In some embodiments, the DAI includes one or more of: a first DAI, a second DAI and a third DAI. In certain embodiments, the DAI may be a set consisting of the first DAI (e.g., a group DAI), the second DAI (e.g., a per-group counter DAI), and the third DAI (e.g., a per-group total DAI). In further embodiments, the combination of first, second, and third DAIs may form a unique tuple for each downlink transmission in the downlink slot set. Examples of the first DAI are discussed above, particularly with reference to FIGS. 6-10. In certain embodiments, the DAI may be a set consisting of the second DAI (e.g., the accumulative DAI) and the third DAI (e.g., the total DAI). Examples of the second DAI are discussed above, particularly with reference to FIGS. 11-12. Examples of the third DAI are discussed above, particularly with reference to FIGS. 13-15.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to communicating HARQ-ACK feedback for a plurality of carrier groups of a downlink slot set. For example, the memory 410 may store DAI values, carrier groupings, HARQ-ACK feedback, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 130. The transceiver 425 may include one or more transmitters 430 and one or more receivers 435. As discussed above, the transceiver 425 may supports one or more the network interface 440 for communicating with remote units 105 and the mobile core network 130.

Figure 5:
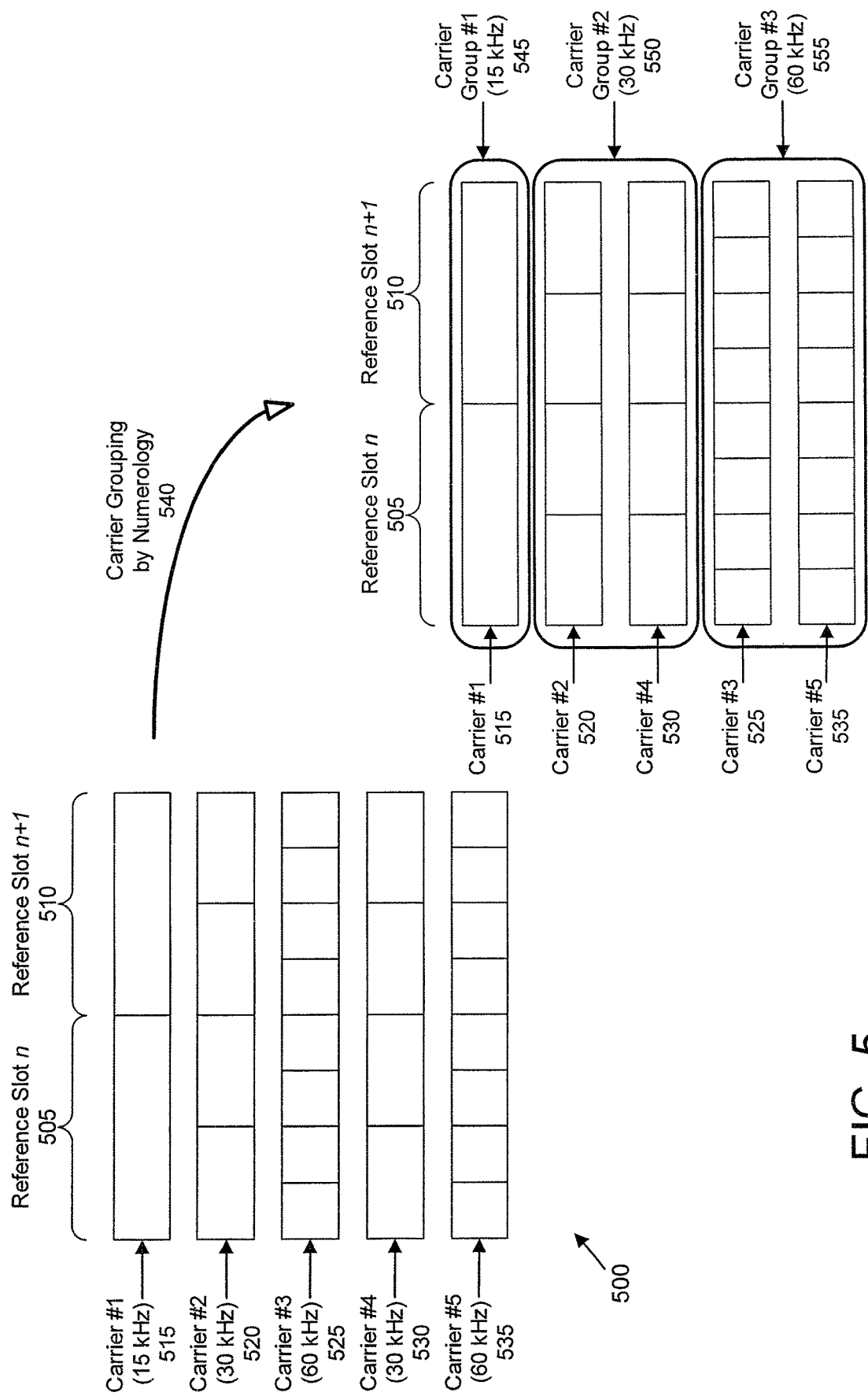
FIG. 5 is a block diagram illustrating one embodiment of grouping carriers based on numerology.

FIG. 5 depicts carrier grouping for carrier aggregation based on numerology, according to embodiments of the disclosure. As depicted, five carriers are configured for carrier aggregation by a UE, such as the UE 205. Here, the configured carriers comprise a first carrier 515 having a subcarrier spacing of 15 kHz, a second carrier 520 having a subcarrier spacing of 30 kHz, a third carrier 525 having a subcarrier spacing of 60 kHz, a fourth carrier 530 having a subcarrier spacing of 30 kHz, and a fifth carrier 535 having a subcarrier spacing of 60 kHz. Each of the carriers 515-535 may correspond to a different serving cell provided by a gNB (such as the gNB 210). Additionally, the carriers 515-535 form a downlink slot set (also referred to herein as a "bundle window") having multiple slots.

Based on the numerology (e.g., the subcarrier spacing value), the carriers configured for carrier aggregation may be grouped into several carrier groups 545-555 (see transformation 540). Here, each carrier group has a unique numerology, such that each carrier in a carrier group has the same subcarrier spacing value. In some embodiments, the carriers within each carrier group are ordered increasingly by serving cell index (e.g., carrier index). Additionally, the formed groups may be ordered from the lower subcarrier spacing value to higher subcarrier spacing value, i.e., from 15 kHz, 30 kHz, 60 kHz, 120 kHz, 240 kHz, 480 kHz. Due to maximum six kinds of numerologies are supported in 5G NR, at most 6 carrier groups are formed. However, additional carrier groups may be formed in systems supporting more than six kinds of numerologies.

In the depicted embodiment, the carriers 515-535 are formed into three carrier groups: a first carrier group 545 corresponding to all configured carriers with subcarrier spacing of 15 kHz (e.g., the first carrier 515), a second carrier group 550 corresponding to all configured carriers with subcarrier spacing of 30 kHz (e.g., the second carrier 520 and the fourth carrier 530), and a third carrier group 555 corresponding to all configured carriers with subcarrier spacing of 60 kHz (e.g., the third carrier 525 and the fifth carrier 535). Note that the carrier groups are ordered increasingly from smallest subcarrier spacing to largest subcarrier spacing.

The bundle window (downlink slot set) comprises multiple serving cells (e.g., carriers) and multiple slots, sometimes to include mini-slots, for which the corresponding HARQ-ACK feedback (aggregated into codebook) shall be transmitted in one UCI. Note, that a normal slot has 7 or 14 symbols, but mini-slot may have a minimum of 1 symbol, and can be anything less than the normal slot size. However, for different numerologies, the slot length may be different. For example, a carrier with 15 kHz subcarrier spacing may have a 1 ms slot length comprising 14 symbols, but a carrier with 60 kHz may have a shorter slot length (e.g., of 250 μs) such that the total symbols in four 15 kHz slots are equal to the total symbols in one 60 kHz slot over the same duration (e.g., 1 ms). In order to synchronize the DAI design, the downlink slot set defines a reference slot (e.g., equal in duration to one slot of the carrier group having the lowest subcarrier spacing). The bundle window size is defined in terms of the reference slot (e.g., defined to the number of reference slots).

As depicted, the downlink slot set 500 includes a first reference slot 505 (having an index of "n") and a second reference slot 510 (having an index of "n+1"). Within one reference slot, the first carrier group 545 has but one slot, while the second carrier group 550 has two slots and the third carrier group 555 has four slots.

FIGS. 6-10 depict various embodiments of a group DAI used in a three-part DAI, according to embodiments of the disclosure. Here, the three-part DAI includes the group DAI, a per-group counter DAI, and a per-group total DAI. The values of the three-part DAI may be used by the UE 205 to perform missed slot detection and to form the HARQ-ACK codebook. Note that the group DAI is useful for performing missing slot detection for an entire carrier group.

FIG. 6 depicts a first embodiment of an arrangement 600 of a group DAI, according to embodiments of the disclosure. Here, the value of the group DAI in DL grant denotes the per-reference-slot accumulative number of carrier groups in which a downlink transmission, such as PDSCH transmission(s) associated with PDCCH or PDCCH indicating DL SPS release, is present. The accumulative number starts at an initial carrier group in a reference slot and goes up to a present carrier group in the reference slot. In this embodiment, the group DAI resets with each reference slot (e.g., is not accumulative between reference slots). For the PDCCHs transmitted in the same carrier group and within same reference slot, the value of group DAI in DL grant is exactly same.

As depicted, in the first reference slot 505, all three carrier groups 545-555 are scheduled with downlink transmission. Accordingly, in the first reference slot 505, the group DAI value is "1" for each downlink transmission in the first carrier group 545, the group DAI value is "2" for each downlink transmission in the second carrier group 550, and the group DAI value is "3" for each downlink transmission in the third carrier group 555. However, in the second reference slot 510, the first carrier group 545 is unscheduled. Accordingly, in the second reference slot 510, the group DAI value is "1" for each downlink transmission in the second carrier group 550 and the group DAI value is "2" for each downlink transmission in the third carrier group 555. Note that the third carrier group has at least one downlink transmission present during the second reference slot 510, even though the fifth carrier 535 is unscheduled for the whole of the second reference slot 510.

FIG. 7 depicts a second embodiment of an arrangement 700 of a group DAI, according to embodiments of the disclosure. In the second embodiment, the value of the group DAI in DL grant denotes the per-downlink-slot-set accumulative number of carrier groups in which a downlink transmission, such as PDSCH transmission(s) associated with PDCCH or PDCCH indicating DL SPS release, is present. The accumulative number starts at an initial carrier group in an initial reference slot (e.g., the first reference slot 505) and goes up to the present carrier group and the present reference slot. In this embodiment, the group DAI is updated from one reference slot to next within the bundle window (e.g., is it accumulative between reference slots of the downlink slot set). For the PDCCHs transmitted in the same carrier group and within same reference slot, the value of group DAI in DL grant is exactly same.

As depicted, in the first reference slot 505, all three carrier groups 545-555 are scheduled with downlink transmission. Accordingly, in the first reference slot 505, the group DAI value is "1" for each downlink transmission in the first carrier group 545, the group DAI value is "2" for each downlink transmission in the second carrier group 550, and the group DAI value is "3" for each downlink transmission in the third carrier group 555. Moreover, in the second reference slot 510, the first carrier group 545 is unscheduled, but at least one downlink transmission is scheduled in each of the second carrier group 550 and the third carrier group 555. Accordingly, in the second reference slot 510, the group DAI value is "4" for each downlink transmission in the second carrier group 550 and the group DAI value is "5" for each downlink transmission in the third carrier group 555.

FIG. 8 depicts a third embodiment of an arrangement 800 of group DAI, according to embodiments of the disclosure. In the third embodiment, the value of the group DAI in DL grant denotes the total number of carrier groups in which a downlink transmission, such as PDSCH transmission(s) associated with PDCCH or PDCCH indicating DL SPS release, is present. In this embodiment, the total number is updated from one reference slot to next within the bundle window (e.g., is it accumulative between reference slots of the downlink slot set). Accordingly, the value of the group DAI in this embodiment is the sum of the number of carrier groups in which downlink transmissions are present in the current reference slot and the number of carrier groups in which downlink transmissions are present in all previous reference slots. For the PDCCHs transmitted in the same reference slot within same bundle window, the value of group DAI in DL grant is exactly same.

As depicted, in the first reference slot 505, all three carrier groups 545-555 are scheduled with downlink transmission. Accordingly, in the first reference slot 505, the group DAI value is "3" for each downlink transmission in the first, second, and third carrier groups 545-555. Because the first carrier group 545 is unscheduled in the second reference slot 510, the group DAI value is "5" for each downlink transmission in the second and third carrier groups 550-555 in the second reference slot 510.

FIG. 9 depicts a fourth embodiment of an arrangement 900 of a group DAI, according to embodiments of the disclosure. In a fourth embodiment, the value of the group DAI in DL grant denotes the total number of carrier groups in which a downlink transmission, such as PDSCH transmission(s) associated with PDCCH or PDCCH indicating DL SPS release, is present in the current reference slot within the bundle window. In this embodiment, the total number is not updated from one reference slot to next within the bundle window (e.g., is it reset between reference slots of the downlink slot set). For the PDCCHs transmitted in same reference slot, the value of group DAI in DL grant is exactly same.

As depicted, in the first reference slot 505, all three carrier groups 545-555 are scheduled with downlink transmission. Accordingly, in the first reference slot 505, the group DAI value is "3" for each downlink transmission in the first, second, and third carrier groups 545-555. Because the first carrier group 545 is unscheduled in the second reference slot 510, but at least one downlink transmission is scheduled in each of the second carrier group 550 and the third carrier group 555, the group DAI value is "2" for each downlink transmission in the second and third carrier groups 550-555 in the second reference slot 510.

FIG. 10 depicts a fifth embodiment of an arrangement 1000 of a group DAI, according to embodiments of the disclosure. Here, the value of the group DAI in DL grant denotes the total number of carrier groups in which a downlink transmission, such as PDSCH transmission(s) associated with PDCCH or PDCCH indicating DL SPS release, is present, within the whole bundle window. For the PDCCHs transmitted in same bundle window, the value of group DAI in DL grant is exactly same.

As depicted, all three carrier groups 545-555 are scheduled with downlink transmission in the first reference slot 505 and the second and third carrier groups 550-555 are scheduled with downlink transmission in the second reference slot 510. Accordingly, the group DAI value is "5" for each downlink transmission in the downlink slot set (bundle window).

In the embodiments of FIGS. 6-10, the DAI is shown as a decimal number. In certain embodiments, it may take up to three bits to represent the DAI in the depicted embodiments. However, other embodiments may have additional carrier groups (e.g., up to six groups for the numerology values discussed above) and/or additional reference slots in the bundle window. To indicate the DAI with fewer bits, in some embodiments the value of the group DAI can be indicated by 2 bits with modular operation, mod(Y−1,4)+1, wherein Y is the value of group DAI.

Additionally, in the embodiments of FIGS. 6-10, the counter DAI and the total DAI are defined per carrier group. Here, the per-group counter DAI is used to denote the accumulative number of downlink transmissions within a carrier group, such as PDSCH transmission(s) associated with PDCCH and/or PDCCH indicating DL SPS release. Here, the counter DAI starts from an initial carrier and slot combination in the carrier group and goes up to a present carrier and present slot combination. The counter DAI increments first in increasing order of carrier index within a carrier group and then in increasing order of slot index within a reference slot. Additionally, the per-group total DAI is used to denote the total number of downlink transmissions within a carrier group. In certain embodiments, the per-group total DAI is updated (e.g., accumulates) from slot to slot within the reference slot. Note that the value of the per-group total DAI may vary from slot to slot in the downlink slot set, depending on the number and placement of the downlink transmissions.

FIGS. 11-15 depict various embodiments of a counter DAI and a total DAI used in a two-part DAI, according to embodiments of the disclosure. Here, the two-part DAI includes a counter DAI (depicted in FIGS. 11-12) and a total DAI (depicted in FIGS. 13-15) that are defined per downlink slot set (bundle window). The values of the two-part DAI may be used by the UE 205 to perform missed slot detection and to form the HARQ-ACK codebook.

FIG. 11 depicts a first embodiment of an arrangement 1100 of a per-set counter DAI, according to embodiments of the disclosure. Here, the value of the per-set counter DAI in DL grant denotes the accumulative number of {carrier group, serving cell, slot} combination in which a downlink transmission, such as PDSCH transmission(s) associated with PDCCH or PDCCH indicating DL SPS release, is present. The per-set counter DAI starts at an initial {carrier group, serving cell, slot} combination and goes up to the present {carrier group, serving cell, slot} combination. As depicted, the per-set counter DAI may increment first in increasing order of carrier group, then in increasing order of serving cell index within the carrier group, and then in increasing order of slot index within the bundle window. As depicted, the per-set counter DAI counts from "1" to "26" for the 26 possible {carrier group, serving cell, slot} combinations in the carriers 515-535 over the reference slots 505-510.

FIG. 12 depicts a second embodiment of an arrangement 1200 of a per-set counter DAI, according to embodiments of the disclosure. The value of the per-set counter DAI is Here, the value of the per-set counter DAI is indicated by 2 bits with the modular operation, mod(Y−1,4)+1, wherein Y is the value of per-set counter DAI as shown in FIG. 11. Advantageously, the arrangement 1200 requires three fewer bits to indicate the per-set counter DAI value, as compared to the arrangement 1100.

FIG. 13 depicts a first embodiment of an arrangement 1300 of a per-set total DAI, according to embodiments of the disclosure. Here, the value of the per-set total DAI in DL grant denotes the total number of {carrier group, serving cell, slot} combinations in which a downlink transmission, such as PDSCH transmission(s) associated with PDCCH or PDCCH indicating DL SPS release, is present in a reference slot of a downlink slot set (bundle window). In this embodiment, the per-set total DAI is updated from one reference slot to next within the bundle window. For the PDCCHs transmitted in same reference slot within same bundle window, the value of per-set total DAI in DL grant is exactly same. In certain embodiments, the value of per-set total DAI is modular with $2^n$, wherein n is the number of bits for indicating the per-set total DAI.

As depicted, there are thirteen {carrier group, serving cell, slot} combinations scheduled in the first reference slot 505 (out of thirteen possible downlink {carrier group, serving cell, slot} combinations). Accordingly, the per-set total DAI corresponding to each downlink transmission in the first reference slot 505 has a value of "13." Also, there are only seven {carrier group, serving cell, slot} combinations scheduled in the second reference slot 510 (out of thirteen possible downlink {carrier group, serving cell, slot} combinations). Accordingly, the per-set total DAI corresponding to each downlink transmission in the second reference slot 510 has a value of "20." Note that the total number of {carrier group, serving cell, slot} combinations scheduled in the downlink slot set (bundle window) is twenty (out of twenty-six possible combinations).

FIG. 14 depicts a second embodiment of an arrangement 1400 of a per-set total DAI, according to embodiments of the disclosure. Here, the value of the per-set total DAI in DL grant denotes the total number of {carrier group, serving cell, slot} combinations in which a downlink transmission, such as PDSCH transmission(s) associated with PDCCH or PDCCH indicating DL SPS release, is present in the present reference slot within the bundle window. In the second embodiment, the per-set total DAI resets (e.g., is not updated) from one reference slot to next within the bundle window. For the PDCCHs transmitted in same reference slot within same bundle window, the value of per-set total DAI in DL grant is exactly same. In certain embodiments, the value of per-set total DAI is modular with $2^n$, wherein n is the number of bits for indicating the per-set total DAI.

As depicted, there are thirteen {carrier group, serving cell, slot} combinations scheduled in the first reference slot 505 (out of thirteen possible downlink {carrier group, serving cell, slot} combinations). Accordingly, the per-set total DAI corresponding to each downlink transmission in the first reference slot 505 has a value of "13." Also, there are only seven {carrier group, serving cell, slot} combinations scheduled in the second reference slot 510 (out of thirteen possible downlink {carrier group, serving cell, slot} combinations). Accordingly, the per-set total DAI corresponding to each downlink transmission in the second reference slot 510 has a value of "7."

FIG. 15 depicts a third embodiment of an arrangement 1500 of a per-set total DAI, according to embodiments of the disclosure. Here, the value of the per-set total DAI in DL grant denotes the total number of {carrier group, serving cell, slot} combinations in which a downlink transmission, such as PDSCH transmission(s) associated with PDCCH or PDCCH indicating DL SPS release is present within the whole bundle window. For the PDCCHs transmitted within same bundle window, the value of per-set total DAI in DL grant is exactly same. As depicted, the total number of {carrier group, serving cell, slot} combinations scheduled in the downlink slot set (bundle window) is twenty (out of twenty-six possible combinations). Accordingly, the per-set total DAI corresponding to each downlink transmission in the downlink slot set (bundle window) has a value of "20."

Figure 16:
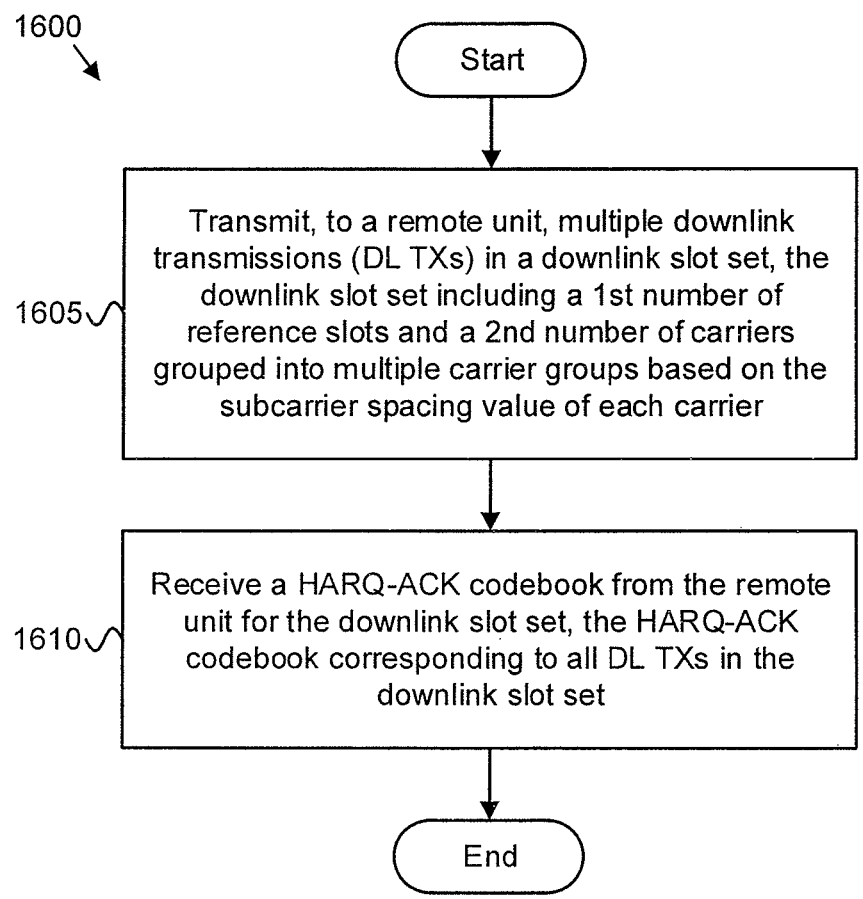
FIG. 16 is a schematic flow chart diagram illustrating one embodiment of a method for communicating HARQ-ACK feedback for a plurality of carrier groups of a downlink slot set.

FIG. 16 is a schematic flow chart diagram illustrating one embodiment of a method 1600 for communicating HARQ-ACK feedback for a plurality of carrier groups of a downlink slot set, according to embodiments of the disclosure. In some embodiments, the method 1600 is performed by a base unit, such as the base unit 110, the gNB 210, and or the base station apparatus 400. In certain embodiments, the method 1600 may be performed by a processor executing program code, for example, a microcontroller, a microprocessor, a CPU, a GPU, an auxiliary processing unit, a FPGA, or the like.

The method 1600 begins and transmits 1605, to a remote unit (such as the UE 205), multiple downlink transmissions in a downlink slot set. Here, the downlink slot set includes a first number of reference slots and a second number of carriers. Moreover, the carriers are grouped into a plurality of carrier groups based on a subcarrier spacing value of each carrier, such that each carrier in a carrier group has the same subcarrier spacing value. In some embodiments, each of the multiple downlink transmissions having a downlink assignment index ("DAI")

In some embodiments, the reference slot is defined based on a slot of a carrier group having the smallest subcarrier spacing. In certain embodiments, the duration of the reference slot may be equal to the slot duration of the carrier group with the smallest subcarrier spacing. In some embodiments, the carriers in each carrier group are ordered increasingly by carrier index and/or the carrier groups are ordered increasingly by subcarrier spacing value. The carrier order and carrier group order may be used to determine the DAI value for a DL transmission, as discussed herein.

The method 1600 includes receiving 1610 a HARQ-ACK codebook from the remote unit for the downlink slot set, wherein the HARQ-ACK codebook for the downlink slot set corresponds to all downlink transmissions in the downlink slot set. In certain embodiments, each bit in the HARQ-ACK codebook is ordered based on the DAI. The method 1600 ends.

In some embodiments, the DAI includes one or more of: a first DAI, a second DAI and a third DAI. In certain embodiments, the DAI may be a set consisting of the first DAI (e.g., a group DAI), the second DAI (e.g., a per-group counter DAI), and the third DAI (e.g., a per-group total DAI). In further embodiments, the combination of first, second, and third DAIs may form a unique tuple for each downlink transmission in the downlink slot set. Examples of the first DAI are discussed above, particularly with reference to FIGS. 6-10. In certain embodiments, the DAI may be a set consisting of the second DAI (e.g., the accumulative DAI) and the third DAI (e.g., the total DAI). Examples of the second DAI are discussed above, particularly with reference to FIGS. 11-12. Examples of the third DAI are discussed above, particularly with reference to FIGS. 13-15.

Figure 17:
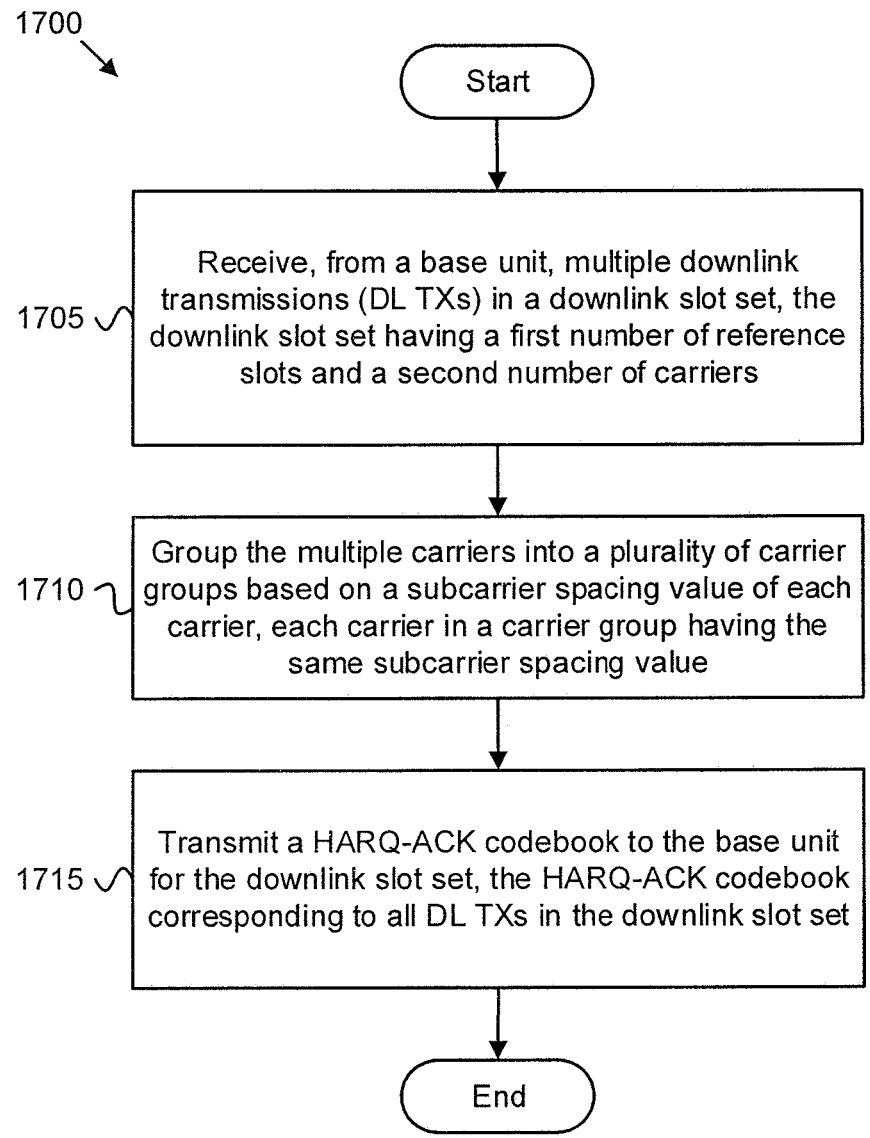
FIG. 17 is a schematic flow chart diagram illustrating another embodiment of a method for communicating HARQ-ACK feedback for a plurality of carrier groups of a downlink slot set.

FIG. 17 is a schematic flow chart diagram illustrating one embodiment of a method 1600 for communicating HARQ-ACK feedback for a plurality of carrier groups of a downlink slot set, according to embodiments of the disclosure. In some embodiments, the method 1700 is performed by a remote unit, such as the remote unit 105, the UE 205, and/or the user equipment apparatus 300. In certain embodiments, the method 1700 may be performed by a processor executing program code, for example, a microcontroller, a microprocessor, a CPU, a GPU, an auxiliary processing unit, a FPGA, or the like.

The method 1700 begins and receives 1705, from a base unit (such as the gNB 210), multiple downlink transmissions in a downlink slot set. Here, the downlink slot set includes a first number of reference slots and a second number of carriers. In some embodiments, each of the multiple downlink transmissions having a downlink assignment index ("DAI")

The method 1700 includes grouping 1710 the multiple carriers into a plurality of carrier groups based on a subcarrier spacing value of each carrier, such that each carrier in a carrier group has the same subcarrier spacing value. In some embodiments, the carriers in each carrier group are ordered increasingly by carrier index and/or the carrier groups are ordered increasingly by subcarrier spacing value. The carrier order and carrier group order may be used to determine the DAI value for a DL transmission, as discussed herein.

The method 1700 includes transmitting 1715 a HARQ-ACK codebook to the base unit for the downlink slot set. Here, the HARQ-ACK codebook for the downlink slot set corresponds to all downlink transmissions in the downlink slot set. In certain embodiments, each bit in the HARQ-ACK codebook is ordered based on the DAI. In some embodiments, the reference slot is defined based on a slot of a carrier group having the smallest subcarrier spacing. In certain embodiments, the duration of the reference slot may be equal to the slot duration of the carrier group with the smallest subcarrier spacing. The method 1700 ends.

In some embodiments, the DAI includes one or more of: a first DAI, a second DAI and a third DAI. In certain embodiments, the DAI may be a set consisting of the first DAI (e.g., a group DAI), the second DAI (e.g., a per-group counter DAI), and the third DAI (e.g., a per-group total DAI). In further embodiments, the combination of first, second, and third DAIs may form a unique tuple for each downlink transmission in the downlink slot set. Examples of the first DAI are discussed above, particularly with reference to FIGS. 6-10. In certain embodiments, the DAI may be a set consisting of the second DAI (e.g., the accumulative DAI) and the third DAI (e.g., the total DAI). Examples of the second DAI are discussed above, particularly with reference to FIGS. 11-12. Examples of the third DAI are discussed above, particularly with reference to FIGS. 13-15.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a receiver that receives, from a base unit, multiple downlink transmissions in a downlink slot set, wherein the downlink slot set comprises a first number of reference slots and a second number of carriers;
    a processor that:
        groups the multiple carriers into a plurality of carrier groups based on a subcarrier spacing value of each carrier, each carrier group comprising a plurality of carriers, wherein a reference slot is defined for a carrier group and is determined based on a first carrier of the carrier group, wherein each carrier in a carrier group has the same subcarrier spacing value;
        generates a reference-slot-specific codebook corresponding to each reference slot of the first number of reference slots; and
    a transmitter that transmits a hybrid automatic repeat request acknowledgement ("HARQ-ACK") codebook to the base unit for the downlink slot set, wherein the HARQ-ACK codebook is formed from the reference-slot-specific codebooks, wherein the HARQ-ACK codebook for the downlink slot set corresponds to all downlink transmissions in the downlink slot set.

2. The apparatus of claim 1, wherein the reference slot is defined based on a slot of a carrier group having the smallest subcarrier spacing.

3. The apparatus of claim 1, wherein the carriers in each carrier group are ordered increasingly by carrier index and wherein the carrier groups are ordered increasingly by subcarrier spacing value.

4. The apparatus of claim 1, wherein each downlink transmission has a downlink assignment index ("DAI") and the DAI comprises one or more of: a first DAI, a second DAI and a third DAI.

5. The apparatus of claim 4, wherein the first DAI denotes an accumulative number of carrier groups in which at least one downlink transmission is present in a reference slot of the downlink slot set, from an initial carrier group in the reference slot to a present carrier group in the reference slot, wherein the accumulative number of carrier groups resets from reference slot to reference slot, and wherein the first DAI is a same value for all downlink transmissions in a same carrier group and a same reference slot.

6. The apparatus of claim 4, wherein the first DAI denotes an accumulative number of carrier groups in which at least one downlink transmission is present, from an initial carrier group in an initial reference slot of the downlink slot set to a present carrier group and a present reference slot, wherein the accumulative number of carrier groups is updated from reference slot to reference slot within the same downlink slot set, wherein the first DAI is a same value for all downlink transmissions in a same carrier group and a same reference slot.

7. The apparatus of claim 4, wherein the first DAI denotes a total number of carrier groups in which at least one downlink transmission is present during one reference slot, from an initial carrier group in an initial reference slot of the downlink slot set to a present carrier group and a present reference slot, wherein the total number of carrier groups is updated from reference slot to reference slot within the same downlink slot set, and wherein the first DAI is a same value for all downlink transmissions in a same reference slot.

8. The apparatus of claim 4, wherein the first DAI denotes a total number of carrier groups in which at least one downlink transmission is present, from an initial carrier group in a reference slot of the downlink slot set to a present carrier group in the reference slot, wherein the total number of carrier groups resets from reference slot to reference slot, and wherein the first DAI is a same value for all downlink transmissions in a same carrier group and a same reference slot.

9. The apparatus of claim 4, wherein the first DAI denotes a total number of carrier group and reference slot combinations in which at least one downlink transmission is present in the downlink slot set, wherein the first DAI is a same value for all downlink transmissions in the downlink slot set.

10. The apparatus of claim 4, wherein the second DAI denotes an accumulative number of downlink transmissions within a carrier group, from an initial downlink transmission in the carrier group up to a present carrier and present slot combination, wherein the accumulative number increments first in increasing order of carrier index within a carrier group then in increasing order of slot index within a reference slot.

11. The apparatus of claim 4, wherein the third DAI denotes a total number of downlink transmissions within a carrier group, from an initial downlink transmission in the carrier group up to a present slot and wherein the third DAI is updated from slot to slot within the reference slot.

12. The apparatus of claim 4, wherein the second DAI denotes an accumulative number of carrier group, carrier and slot combinations in which a downlink transmission is present, up to a present carrier group, present carrier and present slot combination, wherein the accumulative number increments first in increasing order of carrier group then in increasing order of carrier index within the carrier group, and then in increasing order of slot index within the downlink slot set.

13. The apparatus of claim 4, wherein the third DAI denotes a total number of downlink transmissions for the downlink slot set and is a same value for all downlink transmissions in the downlink slot set.

14. The apparatus of claim 4, wherein the value of the third DAI denotes a total number of carrier group, carrier, and slot combinations in which a downlink transmission is present, from an initial downlink transmission up to a present reference slot, wherein the third DAI is updated from reference slot to reference slot within the downlink slot set.

15. The apparatus of claim 4, wherein the value of the third DAI denotes a total number of carrier group, carrier, and slot combinations in which a downlink transmission is present for a present reference slot within the downlink slot set.

16. A method comprising:
    receiving, from a base unit, multiple downlink transmissions in a downlink slot set, wherein the downlink slot set comprises a first number of reference slots and a second number of carriers;
    grouping the multiple carriers into a plurality of carrier groups based on a subcarrier spacing value of each carrier, each carrier group comprising a plurality of carriers, wherein a reference slot is defined for a carrier group and is determined based on a first carrier of the carrier group, wherein each carrier in a carrier group has the same subcarrier spacing value;
    generating a reference-slot-specific codebook corresponding to each reference slot of the first number of reference slots; and
    transmitting a hybrid automatic repeat request acknowledgement ("HARQ-ACK") codebook to the base unit for the downlink slot set, wherein the HARQ-ACK codebook is formed from the reference-slot-specific codebooks, wherein the HARQ-ACK codebook for the downlink slot set corresponds to all downlink transmissions in the downlink slot set.

17. The method of claim 16, wherein the reference slot is defined based on a slot of a carrier group having the smallest subcarrier spacing.

18. The method of claim 16, wherein the carriers in each carrier group are ordered increasingly by carrier index and wherein the carrier groups are ordered increasingly by subcarrier spacing value.

19. The method of claim 16, wherein each downlink transmission has a downlink assignment index ("DAI") and the DAI comprises one or more of: a first DAI, a second DAI and a third DAI.

20. The method of claim 19, wherein the first DAI denotes an accumulative number of carrier groups in which at least one downlink transmission is present in a reference slot of the downlink slot set, from an initial carrier group in the reference slot to a present carrier group in the reference slot, wherein the accumulative number of carrier groups resets from reference slot to reference slot, and wherein the first DAI is a same value for all downlink transmissions in a same carrier group and a same reference slot.

* * * * *